(12) United States Patent
Akatsuka et al.

(10) Patent No.: US 9,592,849 B2
(45) Date of Patent: Mar. 14, 2017

(54) ELECTRIC POWER STEERING SYSTEM WITH MOTOR CONTROLLER

(71) Applicant: DENSO CORPORATION, Kariya, Aichi-pref (JP)

(72) Inventors: Hisaya Akatsuka, Nagoya (JP); Motoaki Kataoka, Kariya (JP); Toshiki Matsumoto, Kariya (JP); Hisashi Iida, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/933,996

(22) Filed: Nov. 5, 2015

(65) Prior Publication Data
US 2016/0129935 A1    May 12, 2016

(30) Foreign Application Priority Data

Nov. 10, 2014 (JP) ................................ 2014-228238

(51) Int. Cl.
| | |
|---|---|
| *B62D 5/04* | (2006.01) |
| *B62D 6/00* | (2006.01) |
| *B62D 15/02* | (2006.01) |

(52) U.S. Cl.
CPC ......... *B62D 5/0463* (2013.01); *B62D 5/0472* (2013.01); *B62D 6/002* (2013.01); *B62D 15/025* (2013.01)

(58) Field of Classification Search
CPC ..... B62D 5/046; B62D 5/0463; B62D 5/0457
See application file for complete search history.

(56) References Cited

U.S. PATENT DOCUMENTS

| | | | | |
|---|---|---|---|---|
| 8,260,500 | B2* | 9/2012 | Murakami | B62D 5/0472 180/446 |
| 8,326,493 | B2* | 12/2012 | Kezobo | B62D 5/0472 180/446 |
| 8,548,684 | B2* | 10/2013 | Kurishige | B62D 5/0463 701/42 |

(Continued)

FOREIGN PATENT DOCUMENTS

| | | |
|---|---|---|
| JP | H09-221053 A | 8/1997 |
| JP | 2003-237607 A | 8/2003 |

*Primary Examiner* — Kevin Hurley
(74) *Attorney, Agent, or Firm* — Knobbe, Martens, Olson & Bear, LLP

(57) ABSTRACT

An electric power steering system for a vehicle works to determine an assist command based on steering torque to produce assist torque through an electric motor for assisting in turning a steering wheel of the vehicle, also determines a tracking command for producing automatic steering torque which brings a value of a given physical quantity associated with steering of the vehicle into agreement a target value, and calculates a vibration correction command for use in producing vibration correction torque which suppresses vibration of the steering torque which arises from output of the torque from the electric motor based on a transfer characteristic of transmission of the output of torque from the electric motor as a part of the steering torque through the steering mechanism. A motor driver works to actuate the electric motor based on the sum of the assist command, the tracking command, and the vibration correction command.

13 Claims, 8 Drawing Sheets

(56) References Cited

U.S. PATENT DOCUMENTS

| | | | |
|---|---|---|---|
| 8,684,129 B2* | 4/2014 | Terada | B62D 5/046 |
| | | | 180/444 |
| 9,327,761 B2* | 5/2016 | Tsubaki | B62D 5/0463 |
| 9,446,789 B2* | 9/2016 | Tsubaki | B62D 15/0285 |
| 2016/0031478 A1* | 2/2016 | Shiraki | B62D 5/0463 |
| | | | 701/41 |
| 2016/0280252 A1* | 9/2016 | Tagami | B62D 3/12 |

* cited by examiner

———— : VIBRATION SUPPRESSED
- - - - : VIBRATION UNSUPPRESSED

VEHICLE SPEED

REACTIVE FORCE FROM ROAD

ELECTRIC POWER STEERING SYSTEM WITH MOTOR CONTROLLER

CROSS REFERENCE TO RELATED DOCUMENT

The present application claims the benefit of priority of Japanese Patent Application No. 2014-228238 filed on Nov. 10, 2014, the disclosure of which is incorporated herein by reference.

BACKGROUND OF THE INVENTION

1. Technical Field

This disclosure relates generally to an electric power steering system (also called a steering assist system) which is equipped with a motor controller engineered to control operation of an electric motor to produce steering assist torque and/or automatic steering torque and suppress steering vibrations.

2. Background Art

Japanese Patent First Publication No. H09-221053 teaches an automotive steering system which analyzes image information derived by a camera which captures an image of a view ahead of a vehicle to calculate a positional relation between a system vehicle equipped with this system and a traffic lane on which the system vehicle is now running, and performs a lane-keep control mode and a power steering control mode using a single actuator (e.g., an electric motor). The lane-keep control mode is to keep the system vehicle on the lane. The power steering control mode is to produce assist torque to assist a vehicle driver in assisting steering the system vehicle.

The above type of steering system is usually equipped with a torsion bar and a torque sensor. The torsion bar is arranged closer to a steering wheel than an electric motor is. The torque sensor works to measure twisting of the torsion bar to determine the degree of torque for steering the system vehicle (which will also be referred to as steering torque below). The torsion bar, however, also experiences twisting when the motor is actuated to output an automatic steering torque as well as when the steering wheel is turned. The steering system, therefore, encounters the drawback in that the twisting of the torsion bar arising from the actuation of the motor to produce the automatic steering torque will result in generation of mechanical vibration in the steering wheel (correctly, a portion of a steering power transmission mechanism which lies between the steering wheel and the torsion bar.

SUMMARY

It is therefore an object to provide an electric power steering system equipped with a motor controller which is designed to minimize vibration of steering torque upon actuation of an electric motor which is used in producing assist torque and/or automatic steering torque for steering the vehicle.

According to one aspect of the invention, there is provided an electric power steering system for a vehicle such as an automobile equipped with a steering mechanism through which steering power is transmitted from a mechanical steering member which is manually operated by a vehicle operator of a system vehicle having this system mounted therein. The electric power steering system comprises: (a) an electric motor which is joined to the steering mechanism and works to output torque for steering the system vehicle; (b) a torsion bar which is installed in the steering mechanism and located between the mechanical steering member and a joint of the electric motor and the steering mechanism; (c) a torsion sensor which measures twisting of the torsion bar as a steering torque; (d) an assist controller which works to determine an assist command as a function of the steering torque, as derived by the torsion sensor, the assist command being to produce assist torque through the electric motor for assisting in turning the steering wheel; (e) a target tracking controller which works to determine a tracking command which produces through the electric motor automatic steering torque which brings a value of a given physical quantity associated with steering of the system vehicle into agreement with a target value; (f) a vibration correction controller which works to calculate a vibration correction torque which suppresses vibration of the steering torque which arises from output of the torque from the electric motor based on a transfer characteristic of transmission of the output of torque from the electric motor as a part of the steering torque, said vibration correction controller determining a vibration correction command to produce the vibration correction torque through the electric motor;

and (g) a motor driver which works to actuate the electric motor based on sum of the assist command, the tracking command, and the vibration correction command.

Specifically, the electric power steering system works to calculate the vibration correction torque based on the transfer characteristic and actuate the electric motor to create the vibration correction torque, thereby suppressing the resonance of the torsion bar to eliminate steering vibration.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiments but are for the purpose of explanation and understanding only.

In the drawings.

DESCRIPTION OF THE PREFERRED EMBODIMENTS

Figure 1:
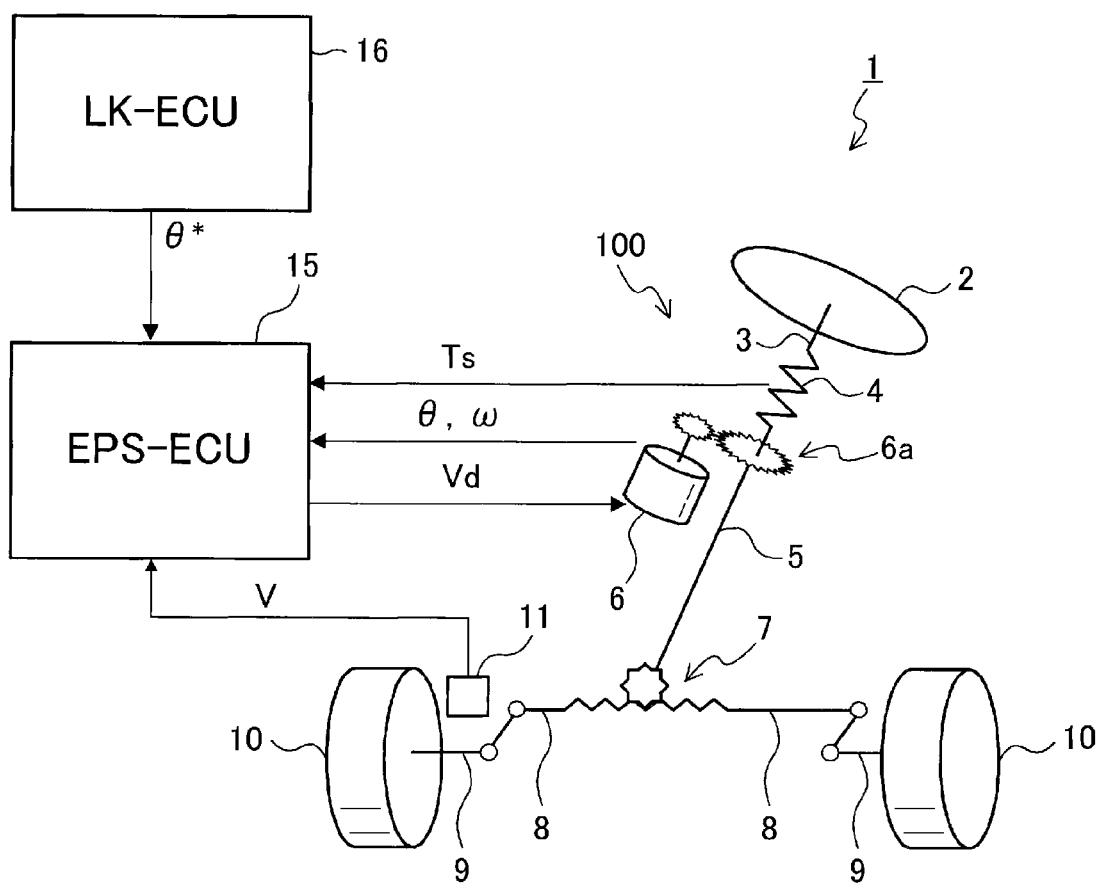
FIG. 1 is a diagram which illustrates an electric power steering system according to an embodiment.

Referring to the drawings, wherein like reference numbers refer to like parts in several views, particularly to FIG. 1, there is shown an electric power steering system (also called power assisted steering system) 1 according to an embodiment which may be used in automotive vehicles. The electric power steering system 1 is engineered to perform a power-assisted steering mode and a target tracking mode. The power-assisted steering mode is to assist a vehicle driver in turning a steering wheel 2 using an electric motor 6. The target tracking mode is to perform automatic steering which controls steering of a vehicle in which the electric power steering system 1 is installed (which will also be referred to as a system vehicle below) along a target course set in a traffic lane. The target tracking mode also includes a lane-keep control mode and a steering control mode executed in autonomous driving (also called autonomous cruising) of the system vehicle.

The electric power steering system 1, as clearly illustrated in FIG. 1, includes the steering wheel 2, a steering shaft 3, a torque sensor 4, an intermediate shaft 5, the electric motor 6, a steering gear box 7, tie rods 8, knuckle arms 9, and tires 10. The electric power steering system 1 also includes an EPS (Electric Power Steering)-ECU 15 and an LK (Lane-Keep)-ECU 16. The steering wheel 2 is a mechanical steering member which is manually operated by a vehicle operator or driver of the system vehicle and on which torque is exerted by the driver.

The steering wheel 2 is joined to an end of the steering shaft 3. The torque sensor 4 is connected at an end thereof to the other end of the steering shaft 3. The intermediate shaft 5 is joined to the other end of the torque sensor 4. In the following discussion, a component train extending from the steering shaft 3 to the intermediate shaft 5 through the torque sensor 4 will also be referred to as a steering shaft train below.

The torque sensor 4 works to measure a steering torque Ts. Specifically, the torque sensor 4 is equipped with a torsion bar 48 which connects between an end of the steering shaft 3 and an end of the intermediate shaft 5. The torque sensor 4 functions as a torsion sensor to measure twisting or a twisted angle of the torsion bar 48 and determines it as the steering torque Ts. In other words, the steering torque Ts expresses a degree of torque acting on the torsion bar 48 which causes the torsion bar 48 to be twisted. Note that the steering torque, as referred to in the following discussion, means a degree of torque arising from twisting of the torsion bar 48 unless otherwise specified.

The electric motor 6 is joined to an end of the torsion bar 48 of the torque sensor 4 (i.e., a lower end of the torsion bar 48, as viewed in FIG. 1) to which the intermediate shaft 5 is joined. In other words, the torsion bar 48 is disposed between the steering wheel 2 and a joint of the electric motor 6 to the intermediate shaft 5. The electric motor 6 serves as an actuator to produce the assist torque in the power-assisted steering mode and automatic steering torque in the target tracking mode. The electric motor 6 outputs torque, which is, in turn, transmitted to the intermediate shaft 5 through a speed reducer 6a. The speed reducer 6a is made up of a worm gear installed on the head of an output shaft of the electric motor 6 and a worm wheel joined coaxially with the intermediate shaft 5 in mesh with the worm gear.

The torque produced by the electric motor 6 is, as described above, transmitted to the intermediate shaft 5. When the steering wheel 2 is turned, so that the intermediate shaft 5 rotates, or the intermediate shaft 5 is rotated by a reactive force transmitted from the road surface, it will cause the rotation of the intermediate shaft 5 to be transmitted to the electric motor 6 through the speed reducer 6a, so that the electric motor 6 rotates.

The electric motor 6 is implemented by, for example, a brushless motor equipped with a rotation sensor (also called a position sensor) such as a resolver. The rotation sensor works to measure operating conditions of the electric motor 6 which at least include an angle by which the electric motor 6 rotates from a reference position (i.e., an angular position of the electric motor 6) and which will also be referred to as a rotation angle $\theta$ of the electric motor 6 below, an angular velocity $\omega$ of the electric motor 6, and an angular acceleration a of the electric motor 6. The rotation sensor may alternatively be engineered to determine a steering angle, a steering angular velocity, and a steering angular acceleration which are derived by multiplying the rotation angle $\theta$, the angular velocity $\omega$, and the angular acceleration a by a gear ratio of the speed reducer 6a.

The end of the intermediate shaft 5 which is opposite the end thereof connecting with the torque sensor 4 is coupled with the steering gear box 7. The steering gear box 7 is made by a gear train including a rack and a pinion gear. Specifically, the pinion gear is installed on the end of the intermediate shaft 5. The rack meshes with the pinion gear. In operation, when the driver turns the steering wheel 2, the intermediate shaft 5 (i.e., the pinion gear) will rotates, thereby moving the rack laterally. The tie rods 8 are joined to the ends of the track, so that they are laterally moved along with the movement of the rack. This causes the knuckle arms 9 to be drawn or pushed by the tie rods 8, thereby steering the tires 10 (i.e., steering the wheels).

Figure 2:
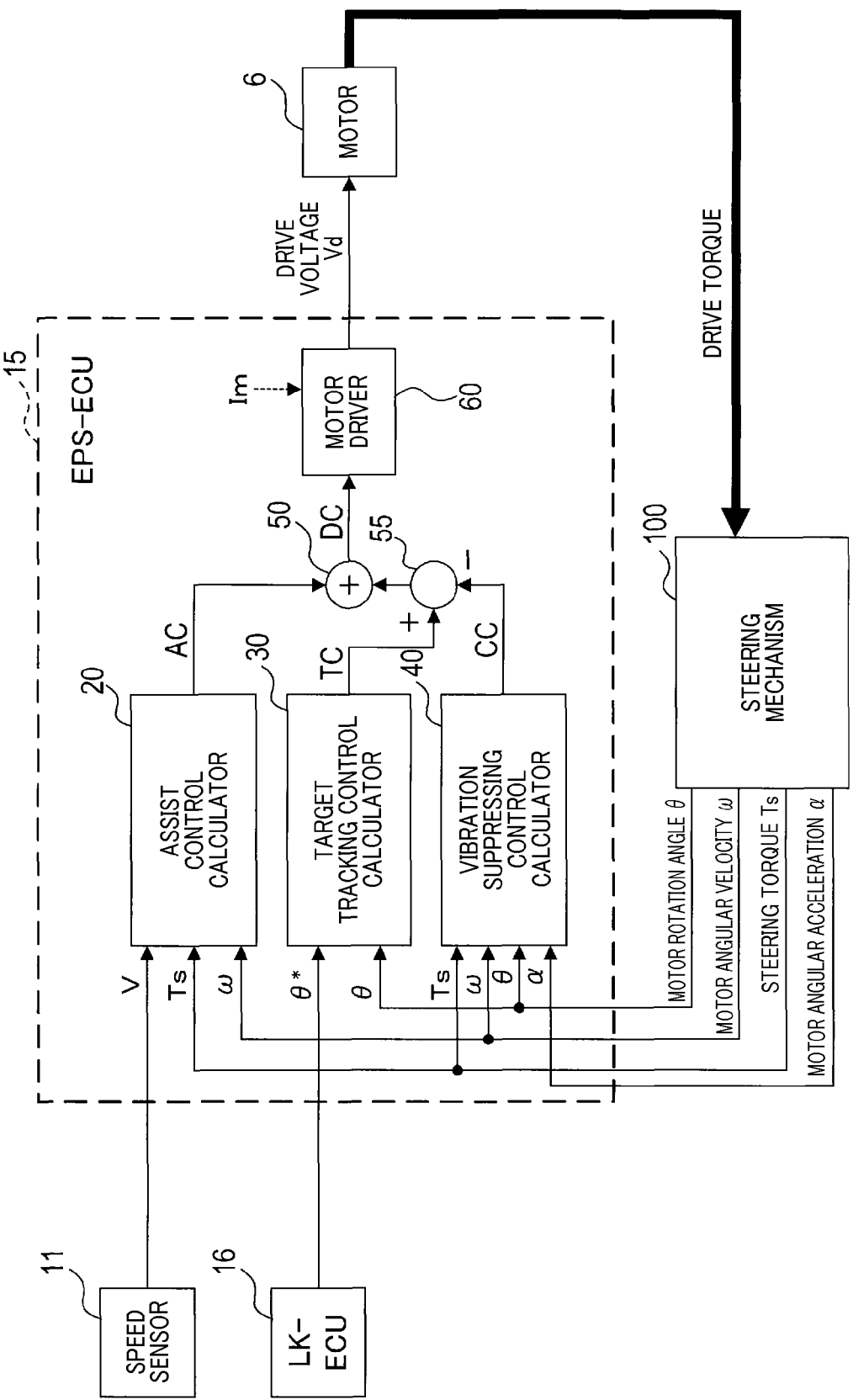
FIG. 2 is a block diagram which illustrates a structure of an electric power steering ECU installed in the electric power steering system of FIG. 1.

The speed sensor 11 is installed on a given part of the system vehicle. The speed sensor 11 works to measure the speed V of the system vehicle and outputs a signal indicative thereof to the EPS-ECU 15. In the following discussion, a power transmission mechanism which includes from the steering wheel 2 to the tires 10 and through which a steering force or power, as produced by the steering wheel 2, is transmitted to each of the tires 10 will also be referred to as a steering mechanism 100 below. The steering mechanism 100 is, as can be seen in FIGS. 1 and 2, connected to the electric motor 6.

In operation of the steering mechanism 100, when the steering wheel 2 is turned by the driver, it will cause torque to be transmitted from the steering wheel 2 to the steering gear box 7 through the steering shaft 3, the torque sensor 4, and the intermediate shaft 5. The steering gear box 7 works to convert the rotation of the intermediate shaft 5 into lateral motion of the tie rods 8, thereby steering the tires 10.

The LK-ECU 16 operates on electric power supplied from a battery (not shown) mounted on the system vehicle. The LK-ECU 16 analyzes an image of a view in front of the system vehicle, as taken by a camera (not shown) installed in the system vehicle, to calculate locations of a traffic lane and the system vehicle on the traffic lane, and determines a target course based on the calculated locations. The LK-ECU 16 also analyzes the speed V of the system vehicle and a steered angle of the steering wheel 2 to calculate a target angle $\theta^*$ that is a target value of an angle by which the electric motor 6 is to be rotated (or a target steering angle) to make the system vehicle track the target course, and outputs the target angle $\theta^*$ to the EPS-ECU 15. The determination of the target angle $\theta^*$ may be achieved in a known way used in the lane keep assist technology, and explanation thereof in detail will be omitted here.

The EPS-ECU 15, like the LK-ECU 16, operates on electric power supplied from the battery mounted on the system vehicle. The EPS-ECU 15 calculates a final command DC as a function of the target angle $\theta^*$, as sent from the LK-ECU 16, the steering torque Ts, as measured by the torque sensor 4, the rotation angle $\theta$, the angular velocity $\omega$, and the angular acceleration a, as outputted from the electric motor 6, and the vehicle speed V, as measured by the speed sensor 11.

The final command DC is the sum of an assist command AC that is a current value required for the electric motor 6 to produce the assist torque, a tracking command TC that is a current value required for the electric motor 6 to produce the automatic steering torque, and a correction command CC that is an electric current value required for the electric motor 6 to reduce or suppress mechanical vibrations, which will be described later in detail. The EPS-ECU 15 determines a drive voltage Vd as a function of the final command DC and outputs it to the electric motor 6 to produce the assist torque and the automatic steering torque.

Specifically, the EPS-ECU 15 works to control the operation of the electric motor 6 through the drive voltage Vd to control steering characteristics, that is, to control the steering mechanism 100 driven by the electric motor 6.

EPS-ECU

The EPS-ECU 15, as illustrated in FIG. 2, includes an assist control calculator 20, a target tracking control calculator 30, a vibration suppressing control calculator 40, an adder 50, a subtractor 55, and a motor drive circuit 60. The assist control calculator 20 serves to produce the assist command AC.

The target tracking control calculator 30 works to produce the tracking command TC. The vibration suppressing control calculator 40 works to produce the correction command CC.

The substractor 55 works to perform a correction operation which subtracts the correction command CC from the tracking command TC and output it to the adder 50. The adder 50 adds the assist command AC and the tracking command TC after corrected to derive the drive command DC that is a current value required to drive the electric motor 6.

The motor drive circuit 60 is responsive to the drive command DC to apply the drive voltage Vd to the electric motor 6. In the case where the electric motor 6 is a three-phase motor, the motor drive circuit 60 converts the drive voltage Vd into respective voltages for three phases of the electric motor 6, thereby controlling energization of the electric motor 6. The assist control calculator 20, the target tracking control calculator 30, the vibration suppressing control calculator 40, the adder 50, and the subtractor 55 may be logically realized by a CPU performing given control programs to execute the tasks thereof.

In the above case, the EPS-ECU 15 performs the control programs cyclically at a given time interval in order to secure a required control response in the target tracking mode (or the lane-keep control mode). The time interval is, for example, several hundred µs to several hundred ms, but is not limited to this as long as it will not adversely affect the target tracking operation.

The EPS-ECU 15 works to update the drive command DC at the above time interval. The realization of the assist control calculator 20, the target tracking control calculator 30, the vibration suppressing control calculator 40, the adder 50, and the subtractor 55 by software is merely an example. At least one of them may be constructed by hardware such as a logic circuit.

Motor Drive Circuit

The motor drive circuit 60 is responsive to the drive command DC to output the drive voltage Vd to the electric motor 6 to exert on the steering shaft train a degree of torque (i.e., the assist torque and/or the automatic steering torque) that is as a function of the drive voltage Vd. Specifically, the motor drive circuit 60 works to regulate the drive voltage Vd so as to bring an energization current Im flowing through the electric motor 6 into agreement with a target current that is the drive command DC in the feedback mode, so that the steering shaft train produces a required degree of torque. This type of motor driver circuit 60 is well known in the art, for example, Japanese Patent Second Publication No. 2013-52793, and explanation thereof in detail will be omitted here.

Assist Control Calculator

The assist control calculator 20 works to produce the assist command AC as a function of the steering torque Ts, the angular velocity $\omega$ of the electric motor 6, and the speed V of the system vehicle. The assist command AC is to create a degree of torque through the electric motor 6 in order to assist the driver in turning the steering wheel 2 (i.e., the tires 10) in a conventional way and/or in order to make the driver feel, through the steering wheel 2, the sense of transmission of a reactive force from the road surface to the driver and/or the sense of steering the tires 10.

Specifically, the assist control calculator 20 calculates a basic assist degree of torque required to achieve the sense of transmission of steering torque to the road surface against the reactive force from the road surface as a function of the steering torque Ts and the speed V of the system vehicle, also calculates an assist compensating degree of torque as a function of the steering torque Ts and the angular velocity $\omega$ of the electric motor 6, and adds a value, as derived by multiplying the assist compensating degree of torque by a gain that is a function of the speed V of the system vehicle, to the basic assist degree of torque to derive the assist command AC in the form of electric current. The calculation of the assist command AC is not limited to the above, but may alternatively be achieved in another way known in the art.

Target Tracking Control Calculator

The target tracking control calculator 30 works to calculate the tracking command TC as a function of the target angle $\theta^*$ and the rotation angle $\theta$ (will also be referred to as an actual angle below) of the electric motor 6. The tracking command TC is a current command value that is an electric current to produce the automatic steering torque through the electric motor 6 which is required to bring the actual angle θ into agreement with the target angle θ*.

Specifically, the target tracking control calculator 30 calculates a difference Δθ between the target angle θ* and the actual angle θ (=θ*−θ) and then applies PID (Proportional-Integral-Derivative) gains to the difference Δθ to determine a control characteristic. The target tracking control calculator 30 then outputs the tracking command TC as a function of the control characteristic.

The responsiveness of the target tracking mode in the tracking command TC increases with increases in the PID gains, while it decreases with decreases in the PID gains.

Vibration Suppressing Control Calculator

Figure 3:
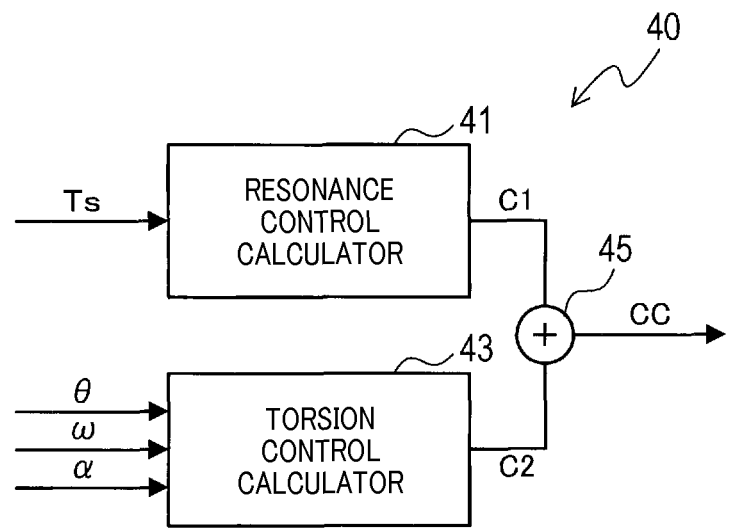
FIG. 3 is a block diagram which illustrates a structure of a vibration suppressing control calculator installed in the electric power steering ECU of FIG. 2.

The vibration suppressing control calculator 40, as illustrated in FIG. 3, includes a resonance control calculator 41, a torsion control calculator 43, and an adder 45. The resonance control calculator 41 works to control oscillation of the steering torque Ts to reduce steering vibration arising from the resonance of the steering mechanism 100 (to be more precise, resonance of the torsion bar 48 of the torque sensor 4). The steering mechanism 100 is a controlled target in the electric power steering system 1.

Figure 4:
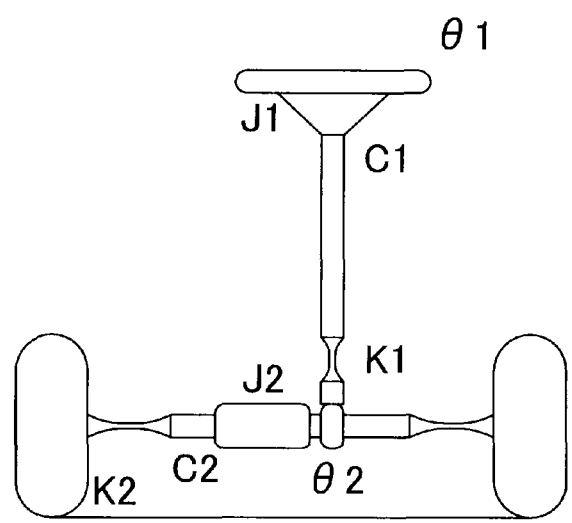
FIG. 4 is a schematic view which illustrates a steering mechanism used in a resonance control calculator installed in the vibration suppressing control calculator of FIG. 3.

Specifically, an equation of motion, as shown below, is derived in an s-domain after being Laplace-transformed using parameters, as illustrated in FIG. 4.

$$\begin{cases} J_1 s^2 \theta_1 + C_1 s \theta_1 + K_1(\theta_1 - \theta_2) = 0 \\ J_2 s^2 \theta_2 + C_2 s \theta_2 + K_2 \theta_2 - K_1(\theta_1 - \theta_2) = Ta \\ K_1(\theta_1 - \theta_2) = Ts \end{cases} \quad (1)$$

where $J_1$ is inertia of the steering wheel 2, $C_1$ is viscosity of the steering wheel 2, $K_1$ is torsional stiffness that is stiffness of the torsion bar 48 of the torque sensor 4, $J_2$ is inertia of the electric motor 6, $C_2$ is viscosity of the electric motor 6, $K_2$ is an equivalent spring modeling the tires 10, Ta is vibration suppressing torque, Ts is torsional torque that is torque acting on the torsion bar 48 of the torque sensor 4, $\theta_1$ is a rotation angle of the steering wheel 2, and $\theta_2$ is a rotation angle of the electric motor 6 converted into an angle of the steering wheel 2.

As apparent from the above equation, the steering torque Ts, as described above, results from the twisting of the torsion bar 48 of the torque sensor 4 and is proportional to a difference between the rotation angle $\theta_1$ of the steering wheel 2 and the rotation angle $\theta_2$ of the electric motor 6 (i.e., the angular position of the output shaft of the electric motor 6). The steering vibration arising from the resonance of the steering mechanism 100 is, therefore, reduced by regulating the steering torque Ts.

The resonance control calculator 41 determines a vibration suppressing torque Ta which cancels the steering torque Ts which is expected to be generated on the torsion bar 48 of the torque sensor 4 when a commanded motor torque Mc is outputted by the electric motor 6 and exerted on the torsion bar 48. The commanded motor torque Mc is a target torque to be produced by the electric motor 6. Specifically, the commanded motor torque Mc is the assist torque, as expressed by the assist command AC outputted from the assist control calculator 20, the automatic steering torque, as expressed by the tracking command TC outputted from the target tracking control calculator 30, or the sum of them. Specifically, the resonance control calculator 41 multiplies the steering torque Ts by a reciprocal of the right term in equation (2) below which expresses a transfer function (i.e., a transfer characteristic) to derive the vibration suppressing torque Ta.

The vibration suppressing torque Ta which will be produced when the commanded motor torque Mc is inputted to the steering mechanism 100 is expressed as $$\frac{Ts}{Ta} = \frac{K_1(\theta_1 - \theta_2)}{Ta} = \frac{(J_1 s^2 + C_2 s) K_1}{(J_1 s^2 + C_1 s + K_1)(J_2 s^2 + C_2 s + K_2) - K_1^2} \quad (2)$$

The steering torque Ts is, therefore, minimized by determining the vibration suppressing torque Ta according to the following equation.

$$Ta = \frac{(J_1 s^2 + C_1 s + K_1)(J_2 s^2 + C_2 s + K_2) - K_1^2}{(J_1 s^2 + C_2 s) K_1} Ts \times LPF \times LPF \quad (3)$$

In Eq. (3), a portion of a term including the steering torque Ts before Ts is the above described reciprocal in the torque transfer function to derive the vibration suppressing torque Ta. LPF expresses a typical low-pass filter. LPF×LPF is used in setting the relative degree of a transfer function of the resonance control calculator 41 to be zero or more to make the resonance control calculator 41 (i.e., the transfer function) proper.

Figure 5:
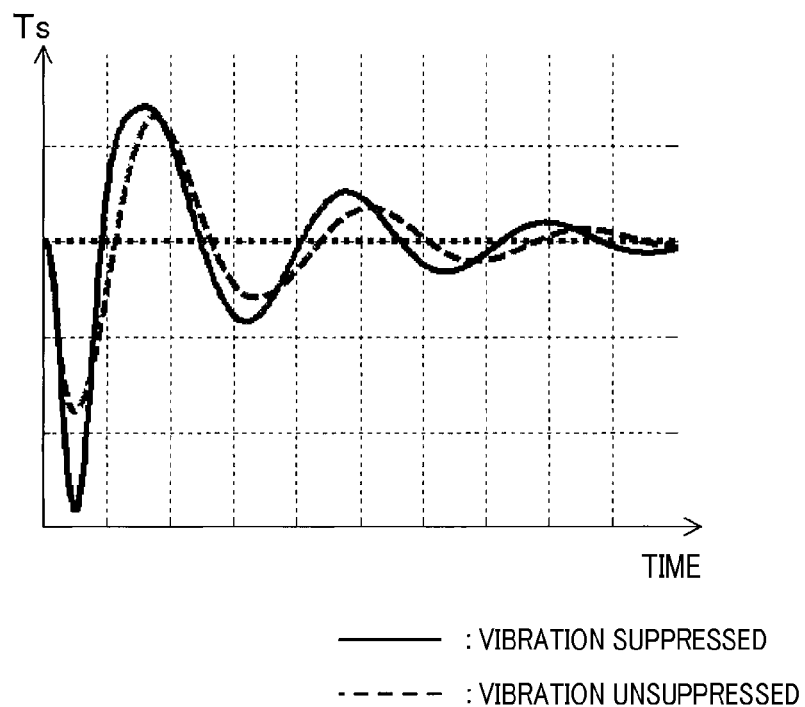
FIG. 5 is a graph which demonstrates a relation between time and a steering torque when a vibration suppressing operation is made and not made.

An example where the steering torque Ts when the resonance control calculator 41 produces a correction torque C1 determined as a function of the vibration suppressing torque Ta derived in the above manner is demonstrated in FIG. 5. In this embodiment, the resonance control calculator 41 determines the vibration suppressing torque Ta directly as the correction torque C1. As compared with a solid line representing the steering torque Ts when the vibration suppressing operation is not performed, that is, the vibration suppressing torque Ta is not produced, the waveform of the steering torque Ts, as indicated by a broken line, when the vibration suppressing operation is made has a smaller peak. This means that the steering vibration is dampened.

Figure 6:
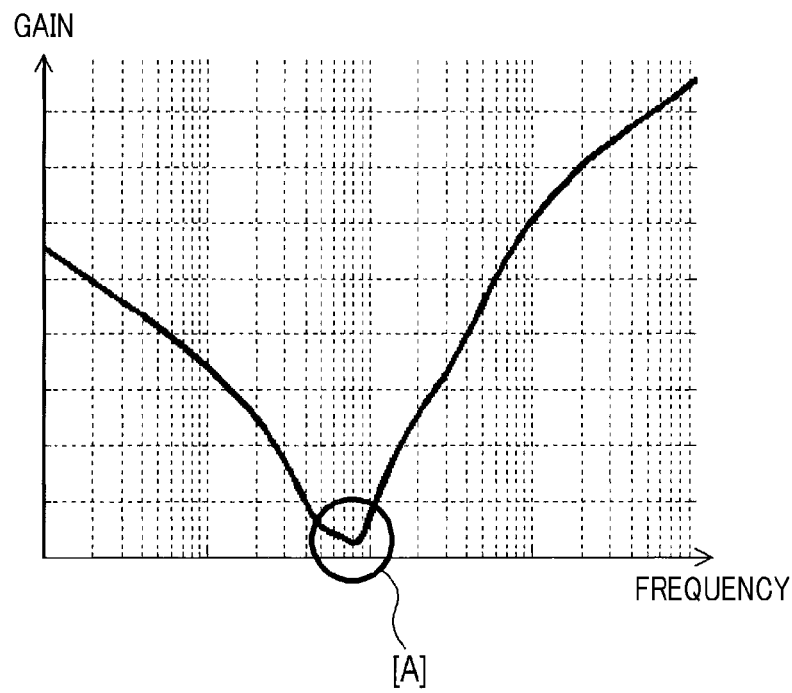
FIG. 6 is a graph which demonstrates a relation between a gain and a frequency of correction torque produced by a resonance suppressing control calculator in the absence of LPF (Low Pass Filter) and HPF (High Pass Filter)

A transfer function shown in Eq. (3) where the steering torque Ts is an input, and the vibration suppressing torque Ta is an output has a frequency characteristic, as illustrated in FIG. 6, which has an antiresonance point [A] where the gain of the vibration suppressing torque Ta (i.e., Ta/Ts) is minimized at a resonance frequency of the torsion bar 48 of the torque sensor 4.

Figure 7:
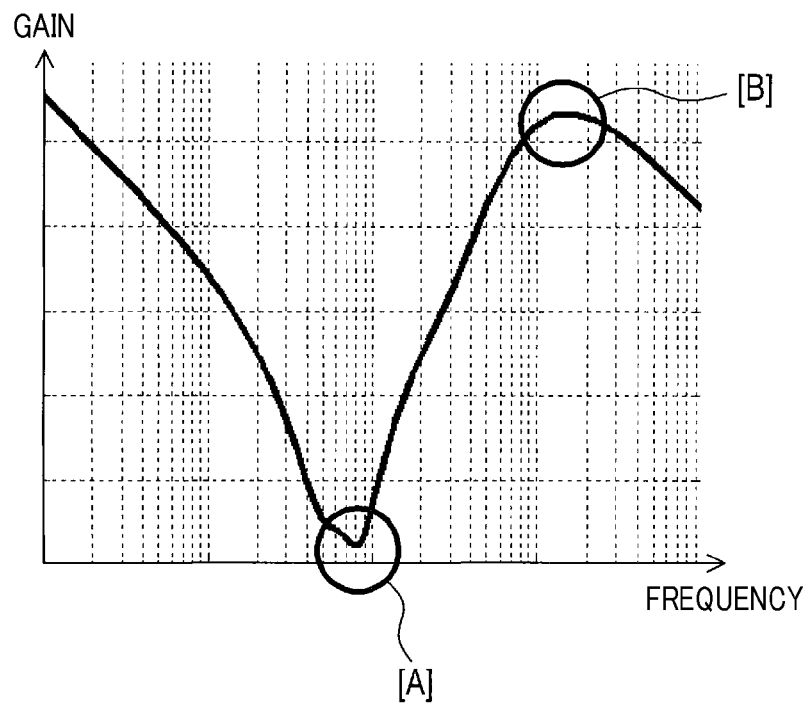
FIG. 7 is a graph which demonstrates a relation between a gain and a frequency of correction torque produced by a resonance suppressing control calculator in the presence of LPF and in the absence of HPF.
Figure 8:
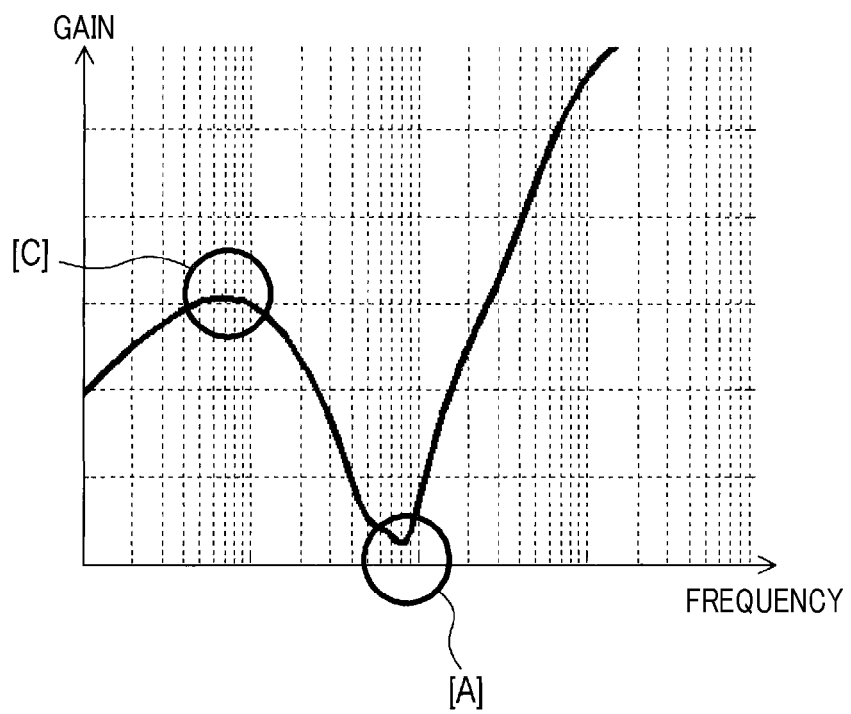
FIG. 8 is a graph which demonstrates a relation between a gain and a frequency of correction torque produced by a resonance suppressing control calculator in the absence of LPF and in the presence of HPF.

The vibration suppressing torque Ta may be determined to have the frequency characteristic, as illustrated in FIG. 7, where there is a resonance point [B] at which the gain is maximized in a frequency range higher than the resonance frequency of the steering torque Ts. The vibration suppressing torque Ta may alternatively be determined to have the frequency characteristic, as illustrated in FIG. 8, where there is a resonance point [C] at which the gain is maximized in a frequency range lower than the resonance frequency of the steering torque Ts.

Figure 9:
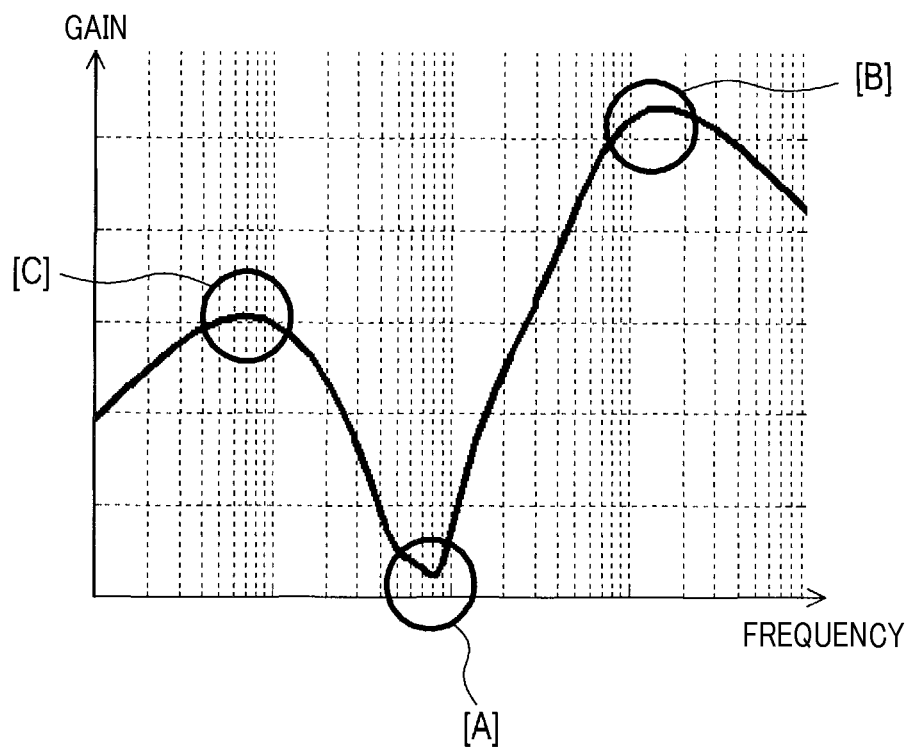
FIG. 9 is a graph which demonstrates a relation between a gain and a frequency of correction torque produced by a resonance suppressing control calculator in the presence of LPF and HPF.

The vibration suppressing torque Ta may alternatively be determined to have the frequency characteristic, as illustrated in FIG. 9, where there are the resonance points [B] and [C] at which the gain is maximized in the frequency ranges higher and lower than the resonance frequency of the steering torque Ts.

For instance, in order to develop the above frequency characteristic, the vibration suppressing torque Ta is calculated according to equation (4) below.

$$Ta = \frac{(J_1 s^2 + C_1 s + K_1)(J_2 s^2 + C_2 s + K_2) - K_1^2}{(J_1 s^2 + C_2 s) K_1} \quad (4)$$

$$Ts \times LPF \times LPF \times [LPF] \times [HPF]$$

where [LPF] is a term expressing the resonance point [B], [HPF] is a high-pass filter, that is, a term expressing the resonance point [C]. [LPF] and [HPF] are used to prevent the gain from increasing undesirably in frequency ranges apart from the resonance frequency of the steering torque Ts.

The torsion control calculator 43 basically works to suppress the steering vibration with substantially the same concept as of the resonance control calculator 41, but brings the value of the steering torque Ts (i.e., the twisting of the torsion bar 48 of the torque sensor 4) close to zero for dampening the steering vibration.

Figure 10:
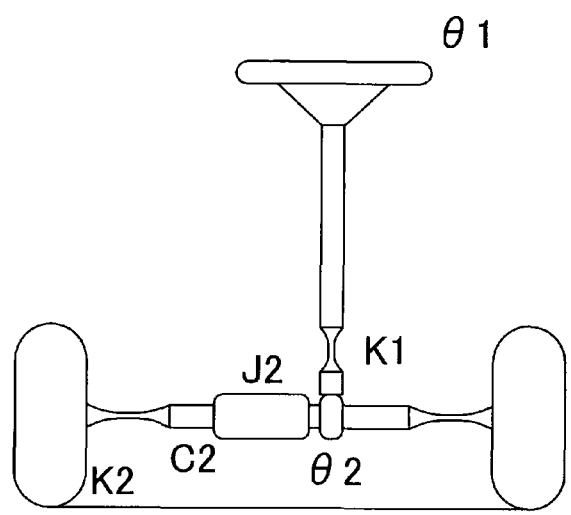
FIG. 10 is a schematic view which illustrates a steering mechanism used in a torsion control calculator installed in the vibration suppressing control calculator of FIG. 3.

Specifically, an equation of motion, as shown below, is derived in an s-domain after being Laplace-transformed using parameters, as illustrated in FIG. 10.

$$\begin{cases} J_2 s^2 \theta_2 + C_2 s \theta_2 - K_2 \theta_2 - K_1(\theta_1 - \theta_2) = Ta \\ K_1(\theta_1 - \theta_2) = Ts \end{cases} \quad (5)$$

where $J_2$ is inertia of the electric motor 6, $C_2$ is viscosity of the electric motor 6, $K_1$ is torsional stiffness that is stiffness of the torsion bar 48 of the torque sensor 4, $K_2$ is an equivalent spring modeling the tires 10, Ta is vibration suppressing torque, Ts is torsional torque that is torque acting on the torsion bar 48 of the torque sensor 4, $\theta_1$ is a rotation angle of the steering wheel 2, and $\theta_2$ is a rotation angle of the electric motor 6 converted into an angle of the steering wheel 2.

From Eq. (5), the vibration suppressing torque Ta required to bring the steering torque Ts into agreement with zero is given by $$J_2 s^2 \theta_2 + C_2 s \theta_2 + K_2 \theta_2 - Ts = Ta$$

$$Ta = J_2 s^2 \theta_2 + C_2 s \theta_2 + K_2 \theta_2 \quad (6)$$

The torsion control calculator 43 calculates a correction torque C2 as a function of the vibration suppressing torque Ta derived according to Eq. (6). In this embodiment, the torsion control calculator 43 determines the vibration suppressing torque Ta directly as the correction torque C2.

The adder 45 adds the correction torque C1, as derived by the resonance control calculator 41, and the correction torque C2, as derived by the torsion control calculator 43, to produce the correction command CC (i.e., a correction torque). The adder 45 then outputs the correction torque CC to the adder 50 through the subtractor 55 illustrated in FIG. 1.

Beneficial Effects of the Electric Power Steering System

The electric power steering system 1 is, as described above, equipped with the assist control calculator 20, the target tracking control calculator 30, and the vibration suppressing control calculator 40. The assist control calculator 20 works to produce the assist command AC which analyzes the steering torque Ts to develop a degree of torque through the electric motor 6 to assist the driver of the system vehicle in turning the steering wheel 2 (i.e., the tires 10) and/or to make the driver feel, through the steering wheel 2, the sense of transmission of a reactive force from the road surface to the driver and/or the sense of steering the tires 10. The target tracking control calculator 30 works to determine a target value of a physical quantity associated with the steering and produce the automatic steering torque which brings a detected value of the physical quantity into agreement with the target value. Specifically, the target tracking control calculator 30 produces the tracking command TC for creating the automatic steering torque through the electric motor 6 which is required to bring the actual angle θ of the electric motor 5 into agreement with the target angle θ*.

The vibration suppressing control calculator 40 is equipped with the resonance control calculator 41 which works as a vibration correction controller to calculate a vibration correction torque (i.e., the correction torque C1) for use in suppressing vibration or oscillation of steering torque (i.e., the steering torque Ts) arising from output of torque from the electric motor 6 to change a steered angle of the tires 10 based on a transfer characteristic of transmission of the output torque from the electric motor 6 (i.e., a transfer characteristic in a mechanism extending from the electric motor 6 to the torsion bar 48 of the torque sensor 4) as at least a portion of the steering torque Ts. The resonance control calculator 41 then produces a vibration correction command used to produce the vibration correction torque. The motor drive circuit 60 is responsive to the sum of the assist command AC, the tracking command TC, and the vibration correction command (i.e., the correction command CC) to control the output torque from the electric motor 6.

In short, the electric power steering system 1 is engineered to calculate the vibration correction torque which suppresses the vibration of the torsion bar 48 based on the above transfer characteristic and actuate the electric motor 6 to produce the vibration correction torque, thereby minimizing the resonance of the torsion bar 48 of the steering mechanism 100 installed in the electric power steering system 1 which is caused by the output torque from the electric motor 6.

The vibration suppressing control calculator 40 also works to calculates the vibration correction torque using the steering torque Ts to suppress the resonance of the torsion bar 48 in the feedback mode.

The vibration suppressing control calculator 40 may work to determine the vibration correction torque (i.e., the vibration suppressing torque Ta) so as to have the frequency characteristic in which there is an antiresonance point at the resonance frequency in the transfer characteristic as a function of a frequency of the steering torque Ts. This enhances the suppression of the resonance of the torsion bar 48 of the torque sensor 4 in the steering mechanism 100.

The vibration suppressing control calculator 40 may also work to determine the vibration correction torque so as to have the frequency characteristic in which there is one or more resonance points in a frequency range higher than the resonance frequency in the transfer characteristic. This avoids an undesirable excess of a gain of the vibration correction torque in the frequency range higher than the resonance frequency in the transfer characteristic.

The vibration suppressing control calculator 40 may also work to determine the vibration correction torque so as to have the frequency characteristic in which there is one or more resonance points in a frequency range lower than the resonance frequency in the transfer characteristic. This avoids an undesirable excess of a gain of the vibration correction torque in the frequency range lower than the resonance frequency in the transfer characteristic.

The vibration suppressing control calculator 40 is also equipped with the torsion control calculator 43 which works as a torque correction controller to calculate a steering correction torque (i.e., the correction torque C2) for use in minimizing the steering torque Ts arising from the output of torque from the electric motor 6 based on the transfer characteristic. The torsion control calculator 43 then produces a steering correction command for use in creating the steering correction torque. The motor drive circuit 60 is responsive to the sum of the assist command AC, the tracking command TC, the vibration correction command, and the steering correction command (i.e., the correction command CC) to control the output torque from the electric motor 6 which is exerted on the steering mechanism 100.

In short, the torsion control calculator 43 is engineered to directly reduce the steering torque Ts which results from the output torque from the electric motor 6, thereby enhancing the suppression of the steering vibration.

The vibration suppressing control calculator 40 also determines the steering correction torque using an operating condition of the electric motor 6 which includes at least one of the rotational speed, the angular velocity, and the angular acceleration of the electric motor 6. The use of such an operating condition of the electric motor 6 enables the steering torque Ts to be calculated, thereby enhancing the suppression of the steering torque Ts arising from the output torque of the electric motor 6.

The vibration suppressing control calculator 40 may also determine the steering correction torque using a physical parameter expressing characteristics of the system vehicle in addition to the operating condition of the electric motor 6. In other words, the steering correction torque is calculated taking the characteristics of the system vehicle into consideration, so that it becomes more suitable for reducing the steering torque Ts.

The physical parameter used by the vibration suppressing control calculator 40 is a value by which the angular velocity of the electric motor 6 is multiplied and which includes the moment of inertia of a steering power transfer mechanism which includes the electric motor 6 and a portion of the steering mechanism 100 extending from the torsion bar 48 of the torque sensor 4 to the tires 10 and including the torsion bar 48 and the tires 10. In other words, the above portion of the steering mechanism 100 is located between a section of the steering power transfer mechanism where the steering torque Ts is measured and the tires 10. In the example of FIG. 4 or 10, the steering power transfer mechanism is between K1 (i.e., the torsion bar 48) and K2 (i.e., the tires 10) and includes K1 and K2.

The physical parameter may also include a viscosity friction coefficient in the above steering power transfer mechanism.

The physical parameter may also include a spring constant between the road surface and an inertial body, that is, the above steering power transfer mechanism.

The physical parameter, therefore, includes at least one of the moment of inertia, the viscosity friction coefficient, and the spring constant, thus enabling the steering correction torque to be determined taking the characteristics of the system vehicle into account.

Modifications

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

A plurality of functions to be performed by one of structural elements of the electric power steering system 1 may be shared with two or more of the structural elements. Alternatively, the functions to be performed by two or more of the structural elements may be assigned to only one of the structural elements. At least one of the above structural elements may be replaced with a known means. One or some of the above structural elements may be omitted.

The electric power steering system 1 in itself or a portion thereof may be realized by logical programs to be executed by a computer, a non-transitory computer readable medium in which such programs are stored, or an electrically steering control method.

The physical parameter used by the vibration suppressing control calculator 40 may include a value (i.e., a physical quantity) which changes depending upon running conditions of the system vehicle. For instance, the physical parameter used in the resonance control calculator 41 or the torsion control calculator 43 includes a physical quantity which will change in response to at least one of the speed of the system vehicle, the reactive force from the road surface, the surface resistance of the road, and the ambient temperature of the system vehicle.

Figure 11:
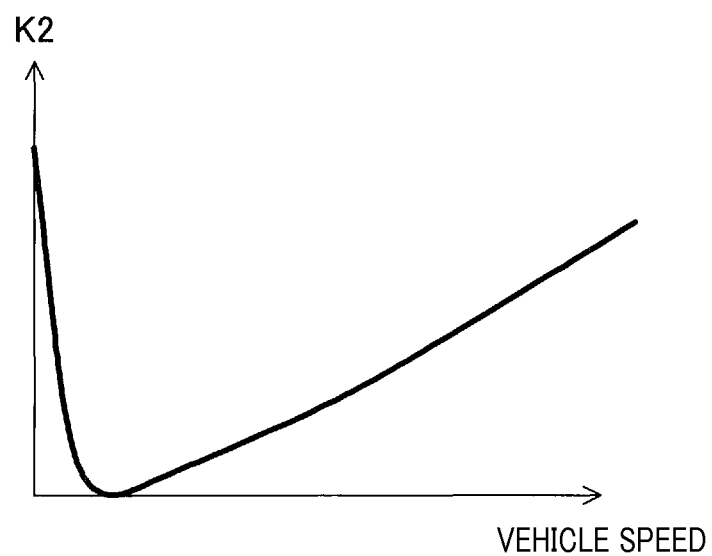
FIG. 11 is a graph which demonstrates an example of a relation between an equivalent spring and a vehicle speed.

For example, the value of the equivalent spring $K_2$ (i.e., the physical parameter) may be changed, as demonstrated in FIG. 11, with a change in speed of the system vehicle. The value of the equivalent spring $K_2$ first decreases as the speed of the system vehicle increases from zero, and then increases with an increase in speed of the system vehicle. Specifically, the graph of FIG. 11 creates steering conditions where the driver feels that the steering is heavy when turning the steering wheel 2 when the system vehicle is stopped, feels that it is light when turning the steering wheel 2 when the system vehicle is running at a low speed, and feels that it is heavy when turning the steering wheel 2 when the system vehicle is running at a high speed.

Figure 12:
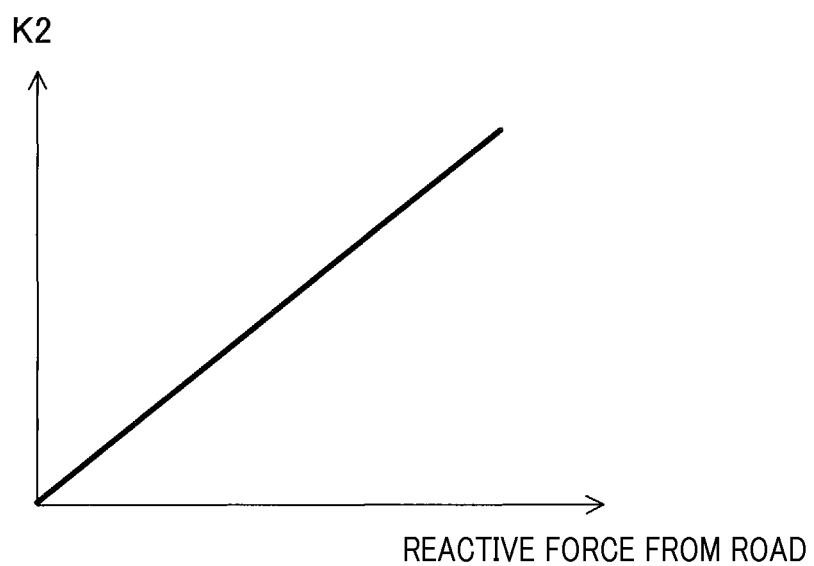
FIG. 12 a graph which demonstrates an example of a relation between an equivalent spring and a reactive force from a road.
Figure 13:
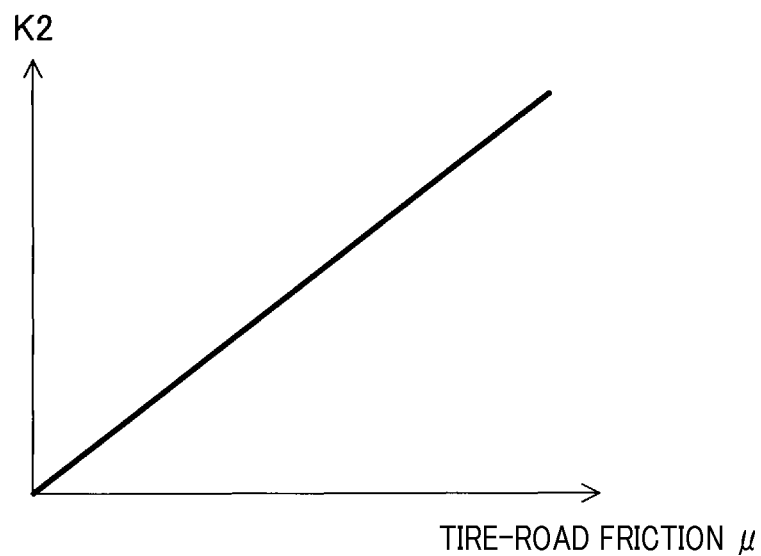
FIG. 13 a graph which demonstrates an example of a relation between an equivalent spring and a tire-road friction coefficient.

The value of the equivalent spring $K_2$ may also be changed, as demonstrated in FIGS. 12 and 13, with a change in reactive force from the road surface on which the system vehicle is running or a change in tire-road friction coefficient $\mu$ (i.e., a tire-road adhesion). Specifically, the value of the equivalent spring $K_2$ is increased with an increase in reactive force and/or tire-road friction coefficient $\mu$.

Figure 14:
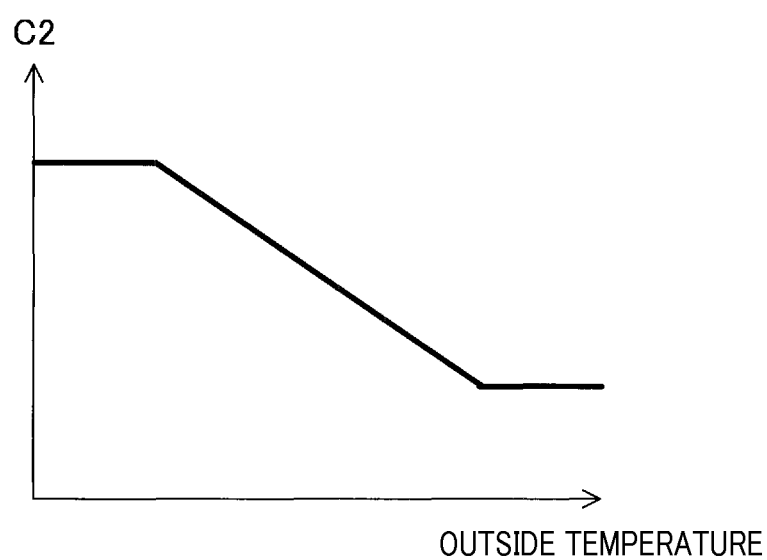
FIG. 14 a graph which demonstrates an example of a relation between a motor viscosity and an ambient temperature.

The value of the motor viscosity $C_2$ may be changed, as demonstrated in FIG. 14, as a function of the ambient temperature (i.e., the air temperature outside the system vehicle). In the sample of FIG. 14, the value of the motor viscosity $C_2$ is decreased with an increase in ambient temperature because the viscosity of lubricating oil in the electric motor 6 usually drops as the ambient temperature rises.

Usually, the viscosity of the lubricating oil does not change linearly. It is, thus, advisable that the value of the motor viscosity C have an upper and a lower limit.

As apparent from the above discussion, the vibration suppressing control calculator 40 may be designed to determine the steering correction torque as a function of the running conditions of the system vehicle such as the speed of the system vehicle, the reactive force from the road surface, the tire-road frictional coefficient, and/or the ambient temperature.

What is claimed is:

1. An electric power steering system for a vehicle equipped with a steering mechanism through which steering power is transmitted from a mechanical steering member which is manually operated by a vehicle operator of a system vehicle having this system mounted therein comprising:

an electric motor which is joined to the steering mechanism and works to output torque for steering the system vehicle;

a torsion bar which is installed in the steering mechanism and located between the mechanical steering member and a joint of the electric motor and the steering mechanism;

a torsion sensor which measures twisting of the torsion bar as a steering torque;

an assist controller which works to determine an assist command as a function of the steering torque, as derived by the torsion sensor, the assist command being to produce assist torque through the electric motor for assisting in turning the mechanical steering member;

a target tracking controller which works to determine a tracking command which produces through the electric motor automatic steering torque which brings a value of a given physical quantity associated with steering of the system vehicle into agreement with a target value;

a vibration correction controller which works to calculate a vibration correction torque which suppresses vibration of the steering torque which arises from output of the torque from the electric motor based on a transfer characteristic of transmission of the output of torque from the electric motor as a part of the steering torque, said vibration correction controller determining a vibration correction command to produce the vibration correction torque through the electric motor; and a motor driver which works to actuate the electric motor based on sum of the assist command, the tracking command, and the vibration correction command.

2. An electric power steering system as set forth in claim 1, wherein the vibration correction controller calculates the vibration correction torque using the steering torque.

3. An electric power steering system as set forth in claim 1, wherein the vibration correction controller determines the vibration correction torque so as to have a frequency characteristic in which there is an antiresonance point at a resonance frequency in the transfer characteristic.

4. An electric power steering system as set forth in claim 1, wherein the vibration correction controller determines the vibration correction torque so as to have a frequency characteristic in which there is one or more resonance points in a frequency range higher than a resonance frequency of the transfer characteristic.

5. An electric power steering system as set forth in claim 1, wherein the vibration correction controller determines the vibration correction torque so as to have a frequency characteristic in which there is one or more resonance points in a frequency range lower than a resonance frequency in the transfer characteristic.

6. An electric power steering system as set forth in claim 1, further comprising a torque correction controller which calculates a steering correction torque for suppressing the steering torque arising from the output of the torque from the electric motor based on the transfer characteristic, and produces a steering correction command, and wherein the motor driver actuates the electric motor based on sum of the assist command, the tracking command, the vibration correction command, and the steering correction command.

7. An electric power steering system as set forth in claim 6, wherein the torque correction controller calculates the steering correction torque as a function of an operating condition of the electric motor which includes at least one of a rotation speed, an angular velocity, and an angular acceleration of the electric motor.

8. An electric power steering system as set forth in claim 6, wherein the torque correction controller also calculates the steering correction torque as a function of a physical parameter expressing a characteristic of the system vehicle in addition to the operating condition of the electric motor.

9. An electric power steering system as set forth in claim 8, wherein the physical parameter is a value by which an angular velocity of the electric motor is multiplied and which includes a moment of inertia of a steering power transfer mechanism, the steering power transfer mechanism including the electric motor and a portion of the steering mechanism, the portion of the steering power transfer mechanism extending from the torsion bar where the steering torque is measured to a tire of the system vehicle.

10. An electric power steering system as set forth in claim 8, wherein the physical parameter is a value by which an angular velocity of the electric motor is multiplied and which includes a viscosity friction coefficient of a steering power transfer mechanism, the steering power transfer mechanism including the electric motor and a portion of the steering mechanism, the portion of the steering power transfer mechanism extending from the torsion bar where the steering torque is measured to a tire of the system vehicle.

11. An electric power steering system as set forth in claim 8, wherein the physical parameter is a value by which an angular velocity of the electric motor is multiplied and which includes a spring constant between a road surface and an inertial body, the inertial body being a steering power transfer mechanism, the steering power transfer mechanism including the electric motor and a portion of the steering mechanism, the portion of the steering power transfer mechanism extending from the torsion bar where the steering torque is measured to a tire of the system vehicle.

12. An electric power steering system as set forth in claim 8, wherein the physical parameter includes a value which changes as a function of a running condition of the system vehicle.

13. An electric power steering system as set forth in claim 12, wherein the physical parameter includes at least one of a speed of the system vehicle, a reactive force from a road surface, a tire-road friction coefficient, and an ambient temperature.

* * * * *